(12) United States Patent
Cuthbert et al.

(10) Patent No.: US 10,364,667 B2
(45) Date of Patent: Jul. 30, 2019

(54) DOWNHOLE MICROSEISMIC DETECTION FOR PASSIVE RANGING TO A TARGET WELLBORE

(71) Applicant: Halliburton Energy Services, Inc., Houston, TX (US)

(72) Inventors: Andrew J. Cuthbert, Houston, TN (US); Joseph E. Hess, Houston, TX (US); Carl J. Cramm, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 246 days.

(21) Appl. No.: 15/315,208

(22) PCT Filed: Jul. 7, 2014

(86) PCT No.: PCT/US2014/045583
§ 371 (c)(1),
(2) Date: Nov. 30, 2016

(87) PCT Pub. No.: WO2016/007123
PCT Pub. Date: Jan. 14, 2016

(65) Prior Publication Data
US 2017/0198567 A1    Jul. 13, 2017

(51) Int. Cl.
*E21B 47/10* (2012.01)
*G01V 1/40* (2006.01)
*G01V 1/28* (2006.01)

(52) U.S. Cl.
CPC ............ *E21B 47/101* (2013.01); *G01V 1/288* (2013.01); *G01V 1/40* (2013.01)

(58) Field of Classification Search
CPC ......... E21B 47/101; G01V 1/288; G01V 1/40
See application file for complete search history.

(56) References Cited

U.S. PATENT DOCUMENTS

| 8,902,707 B2 * | 12/2014 | Chen | G01V 1/42 367/57 |
| 9,243,489 B2 * | 1/2016 | Veeningen | E21B 47/02 |

(Continued)

FOREIGN PATENT DOCUMENTS

| CN | 001325494 A | 12/2001 |
| JP | 2003516516 A | 5/2003 |

OTHER PUBLICATIONS

International Search Report and Written Opinion issued in corresponding PCT application No. PCT/US2014/045583, dated Apr. 1, 2015, 2 pgs.

*Primary Examiner* — Krystine E Breier
(74) *Attorney, Agent, or Firm* — Chamberlain Hrdlicka

(57) ABSTRACT

A method can include measuring microseismic activity in a relief wellbore, thereby detecting a microseismic event in an earth formation penetrated by the relief wellbore, and determining a location of an influx into a target wellbore, based on the microseismic event detecting. A microseismic ranging system for use with a subterranean well can include at least one microseismic sensor in a relief wellbore that penetrates an earth formation, with the microseismic sensor detecting a microseismic event in the formation, the microseismic event being caused by an influx into a target wellbore. Another method can include measuring optical scattering in an optical waveguide positioned in a relief wellbore, thereby detecting a microseismic event in an earth formation penetrated by the relief wellbore, and determining a location of an influx into a target wellbore, based on the microseismic event detecting.

18 Claims, 4 Drawing Sheets

(56) References Cited

U.S. PATENT DOCUMENTS

| | | |
|---|---|---|
| 9,341,727 B2* | 5/2016 | Ma ........................ G01V 1/288 |
| 9,903,972 B2* | 2/2018 | Kjos ........................ G01V 1/40 |
| 2005/0149267 A1 | 7/2005 | Van Den Beukel et al. |
| 2013/0128694 A1* | 5/2013 | Lacazette ............... G01V 1/288 |
| | | 367/27 |
| 2013/0161098 A1 | 7/2013 | Maida, Jr. et al. |
| 2013/0167628 A1* | 7/2013 | Hull ....................... G01V 1/001 |
| | | 73/152.58 |
| 2016/0259079 A1* | 9/2016 | Wilson .................... G01V 1/42 |

* cited by examiner

DOWNHOLE MICROSEISMIC DETECTION FOR PASSIVE RANGING TO A TARGET WELLBORE

TECHNICAL FIELD

This disclosure relates generally to equipment utilized and operations performed in conjunction with a subterranean well and, in one example described below, more particularly provides for passive ranging to a target wellbore using downhole microseismic event detection.

BACKGROUND

A relief wellbore can be drilled to intersect or otherwise establish fluid communication with a target wellbore. Typically, an undesired and uncontrolled influx into the target wellbore is occurring while the relief wellbore is being drilled. When fluid communication between the relief and target wellbores is established, measures can be taken to stop, or at least control, the influx into the target wellbore. Therefore, it will appreciated that improvements are continually needed in the art of ranging from a relief wellbore to a target wellbore.

DETAILED DESCRIPTION

Figure 1:
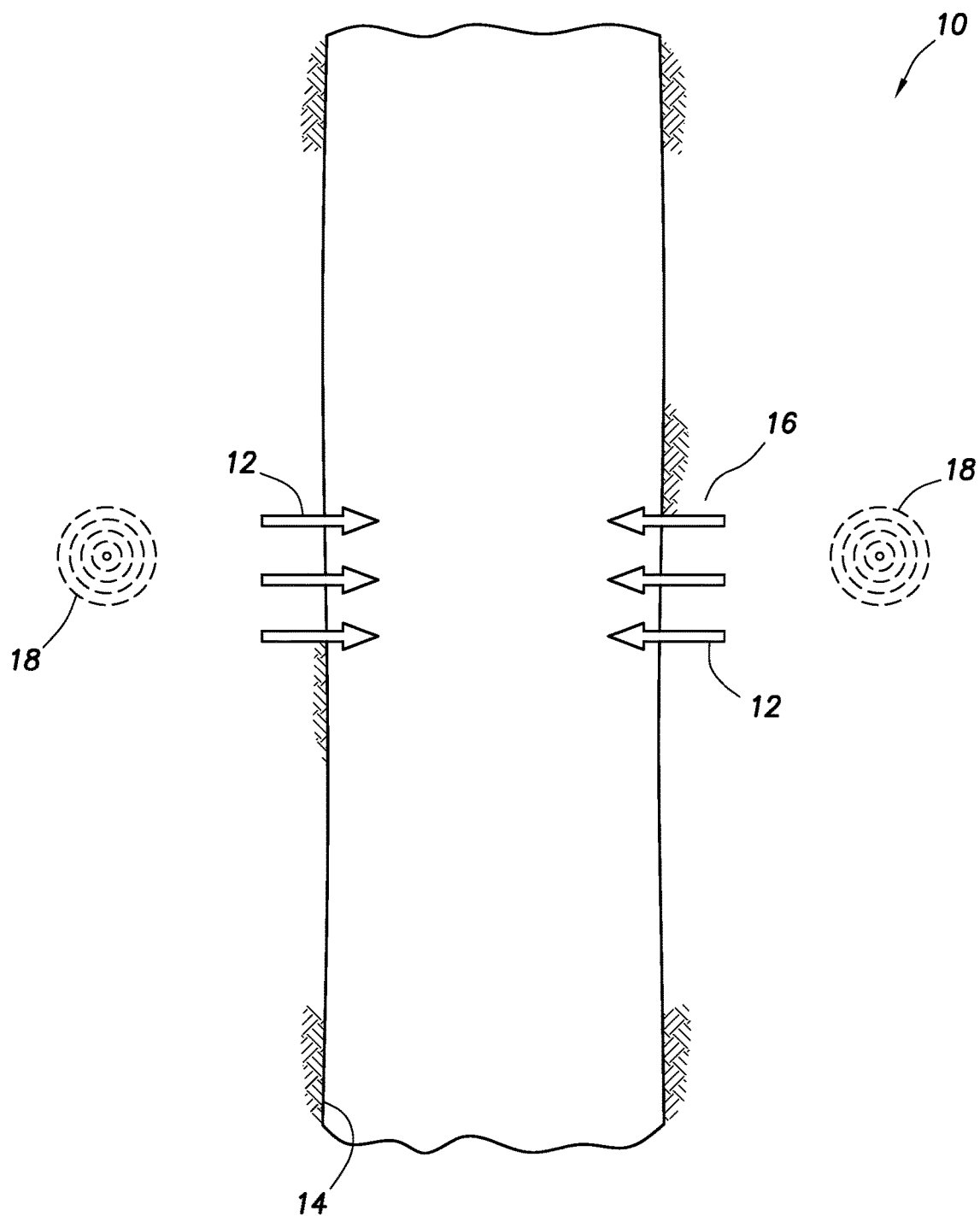
FIG. 1 is a representative cross-sectional view of a well system and associated method which can embody principles of this disclosure.

Representatively illustrated in FIG. 1 is a system 10 for use with a subterranean well, and an associated method, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, an undesired and uncontrolled influx 12 is flowing into a target wellbore 14. It is desired to stop, or at least control, the influx 12.

For this purpose, a relief wellbore (not shown in FIG. 1, see FIGS. 2-4) is to be drilled to establish fluid communication with the target wellbore 14. In order to determine where fluid communication should be established between the relief wellbore and the target wellbore 14, it is highly desirable to accurately know a location of the influx 12.

In the FIG. 1 example, the target wellbore 14 is uncased or open hole at the location of the influx 12. Thus, prior methods of ranging to a target wellbore (e.g., wherein a magnetic field sensor is positioned in a relief wellbore and used to detect ferromagnetic materials in the target wellbore) are of no use to locate the target wellbore, and certainly cannot be used to determine a location of the influx 12 into the target wellbore 14.

However, the principles of this disclosure can be used to locate an influx into a cased or an uncased portion of a target wellbore. Thus, the scope of this disclosure is not limited to any particular influx location, or whether the influx is in a cased or uncased portion of a target wellbore.

The present inventors have conceptualized that the influx 12 will be associated with a mobilization of fluids in and from an earth formation 16 surrounding the target wellbore 14, and will thus result in microseismic events 18 in the formation proximate the location of the influx. For example, such microseismic events 18 may be due to changes in stress distribution in the formation 16, or to changes in reservoir volume in the formation, due to the loss of fluid from the reservoir. However, it should be clearly understood that the scope of this disclosure is not limited to any particular reason for the microseismic events 18 resulting from the presence of the influx 12.

The microseismic events 18 are of the type known to those skilled in the art as "induced" microseismic events, in that they occur because of some human activity, rather than because of natural occurrences (such as tides, ocean wave action, etc.). In the present case, it is the removal of the influx 12 fluid from the formation 16 (due, for example, to the human activity of drilling the wellbore 14) that causes the microseismic events 18 to occur.

Figure 2:
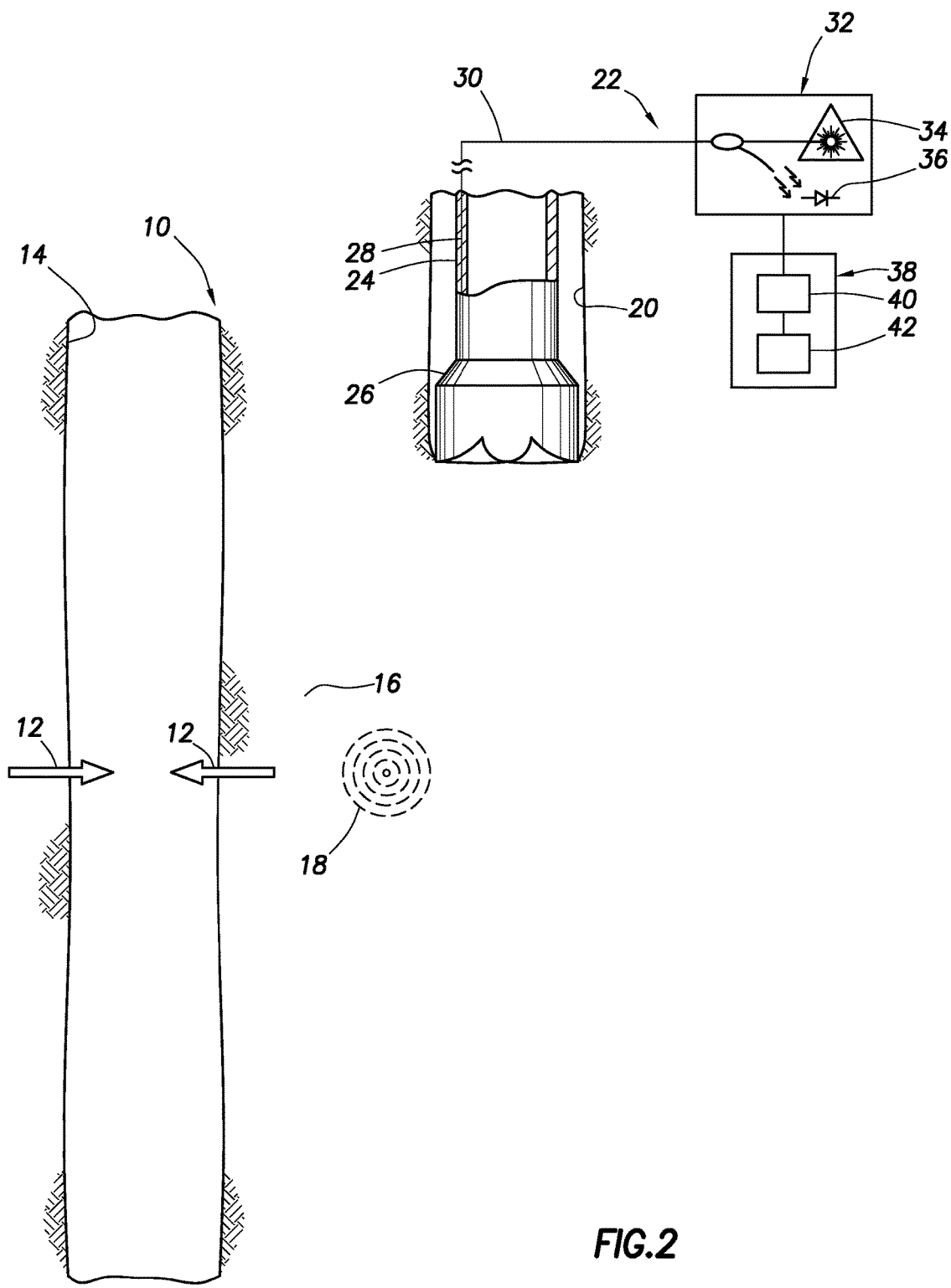
FIG. 2 is a representative partially cross-sectional view of the system and method, wherein a relief wellbore is being drilled.

Referring additionally now to FIG. 2, the system 10 and method are representatively illustrated with a relief wellbore 20 being drilled. Also depicted in FIG. 2 is a microseismic ranging system 22 that can be used to locate the influx 12, so that fluid communication can be established with the target wellbore 14 as desired relative to the location of the influx (e.g., above, below or at the influx).

In the FIG. 2 example, the relief wellbore 20 is being drilled with a drill string 24 having a drill bit 26 at a distal end thereof. Any method, technique or equipment (such as, rotary, percussion or jet drilling with continuous or segmented drill pipe, etc.) may be used to drill the relief wellbore 20 in keeping with the principles of this disclosure.

A microseismic sensor 28 is positioned in a wall of the drill string 24. In other examples, the microseismic sensor 28 could be internal or external to the drill string 24. In some examples, the microseismic sensor 28 could be positioned in the relief wellbore 20 separate from the drill string 24. For example, the microseismic sensor 28 could be run on wireline, coiled tubing or another type of conveyance into the relief wellbore 20 when the drill string 24 is not present in the relief wellbore.

The microseismic sensor 28 can be a distributed microseismic sensor capable of measuring vibration at various locations, or continuously, longitudinally along the relief wellbore 20. One or more discrete microseismic sensors or a continuous microseismic sensor may be used in keeping with the principles of this disclosure.

In the FIG. 2 example, the microseismic sensor 28 includes an optical waveguide 30 (such as, an optical fiber or optical ribbon). The optical waveguide 30 extends to an optical interrogator 32 positioned, for example, at a surface location.

The optical interrogator 32 is depicted schematically in FIG. 2 as including an optical source 34 (such as, a laser or a light emitting diode) and an optical detector 36 (such as, an opto-electric converter or photodiode). The optical source 34 launches light (electromagnetic energy) into the waveguide 30, and light returned to the interrogator 32 is detected by the detector 36. Note that it is not necessary for the light to be launched into a same end of the optical waveguide 30 as an end via which light is returned to the interrogator 32.

Other or different equipment (such as, an interferometer or an optical time domain or frequency domain reflectometer) may be included in the interrogator 32 in some examples. The scope of this disclosure is not limited to use of any particular type or construction of optical interrogator.

A computer 38 is used to control operation of the interrogator 32, and to record optical measurements made by the interrogator. In this example, the computer 38 includes at least a processor 40 and memory 42. The processor 40 operates the optical source 34, receives measurement data from the detector 36 and manipulates that data. The memory 42 stores instructions for operation of the processor 40, and stores processed measurement data. The processor 40 and memory 42 can perform additional or different functions in keeping with the scope of this disclosure.

In other examples, different types of computers may be used, and the computer 38 could include other equipment (such as, input and output devices, etc.). The computer 38 could be integrated with the interrogator 32 into a single instrument. Thus, the scope of this disclosure is not limited to use of any particular type or construction of computer.

The optical waveguide 30, interrogator 32 and computer 38 may comprise a distributed vibration sensing (DVS) system capable of detecting vibration as distributed along the optical waveguide. For example, the interrogator 44 could be used to measure Brillouin or coherent Rayleigh scattering as an indication of vibration as distributed along the optical waveguide 30.

Brillouin light scattering occurs as a result of interaction between a propagating optical signal and thermally excited acoustic waves (e.g., within the GHz range) present in silica optical material. This gives rise to frequency shifted components in the optical domain, and can be seen as the diffraction of light on a dynamic in situ "virtual" optical grating generated by an acoustic wave within the optical media. Note that an acoustic wave is actually a pressure wave which introduces a modulation of the index of refraction via an elasto-optic effect.

The diffracted light experiences a Doppler shift, since the grating propagates at the acoustic velocity in the optical media. The acoustic velocity is directly related to the silica media density, which is temperature and strain dependent. As a result, the so-called Brillouin frequency shift carries with it information about the local temperature and strain of the optical media.

Coherent Rayleigh light scattering is also caused by fluctuations or non-homogeneities in silica optical media density, but this form of scattering is purely "elastic." In contrast, both Raman and Brillouin scattering effects are "inelastic," in that "new" light or photons are generated from the propagation of light through the media.

In the case of coherent Rayleigh light scattering, temperature or strain changes are identical to an optical source (e.g., very coherent laser) wavelength change. Unlike conventional Rayleigh backscatter detection techniques (using common optical time domain reflectometers), because of an extremely narrow spectral width of the optical source 34 (with associated long coherence length and time), coherent Rayleigh (or phase Rayleigh) scatter signals experience optical phase sensitivity resulting from coherent addition of amplitudes of the light scattered from different parts of the optical media which arrive simultaneously at the optical detector 36.

Figure 3:
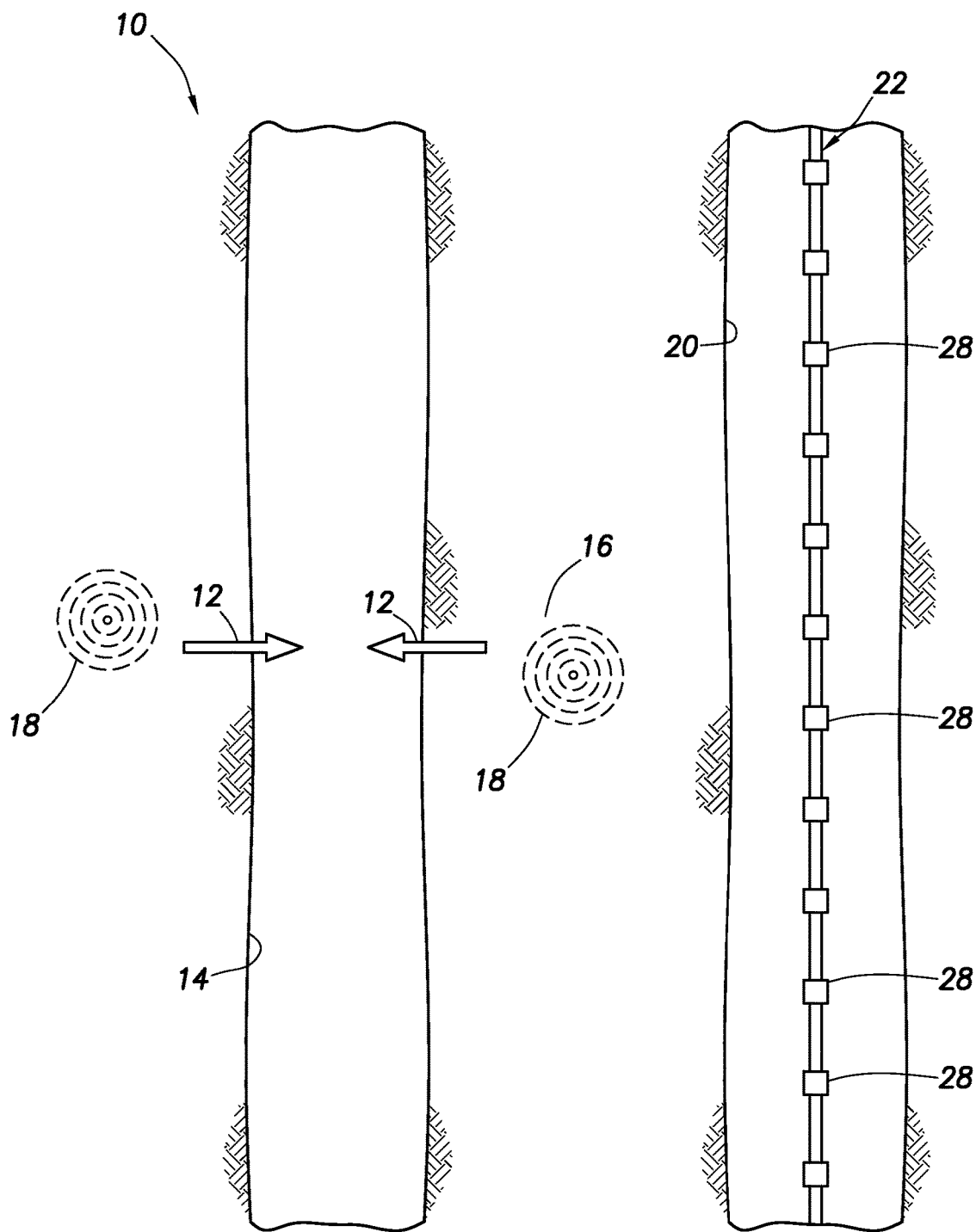
FIG. 3 is a representative partially cross-sectional view of the system and method, wherein a microseismic event is detected by a microseismic sensor in the relief wellbore.

Referring additionally now to FIG. 3, the well system 10 is representatively illustrated with the relief wellbore 20 drilled sufficiently close to the influx 12 in the target wellbore 14, so that microseismic sensors 28 are able to detect the microseismic events 18 due to the influx. The location of the influx 12 can now be determined from the measurements of the microseismic events 18.

In this example, the microseismic sensors 28 comprise geophones, which may include accelerometers. Various types of suitable vibration and/or acceleration sensors may be used for the microseismic sensors 28. Thus, the scope of this disclosure is not limited to use of any particular type of microseismic sensor.

Note that it is not necessary for the relief wellbore 20 to be drilled past (e.g., deeper than) the influx 12, in order for the influx location to be determined. Instead, in some examples, some of the microseismic events 18 can be detected as the relief wellbore 20 approaches a depth of the influx 12.

In some examples, as the location of the influx 12 is approached, it may be appropriate to conduct surveys with the sensors 28 (e.g., using wireline or coiled tubing to convey the sensors) with increased frequency, in order to improve accuracy of ranging to the influx location. If the microseismic sensor 28 is part of the drill string 24 (as in the FIG. 2 example), then drilling can be ceased while the sensor is used to detect the microseismic events 18.

Figure 4:
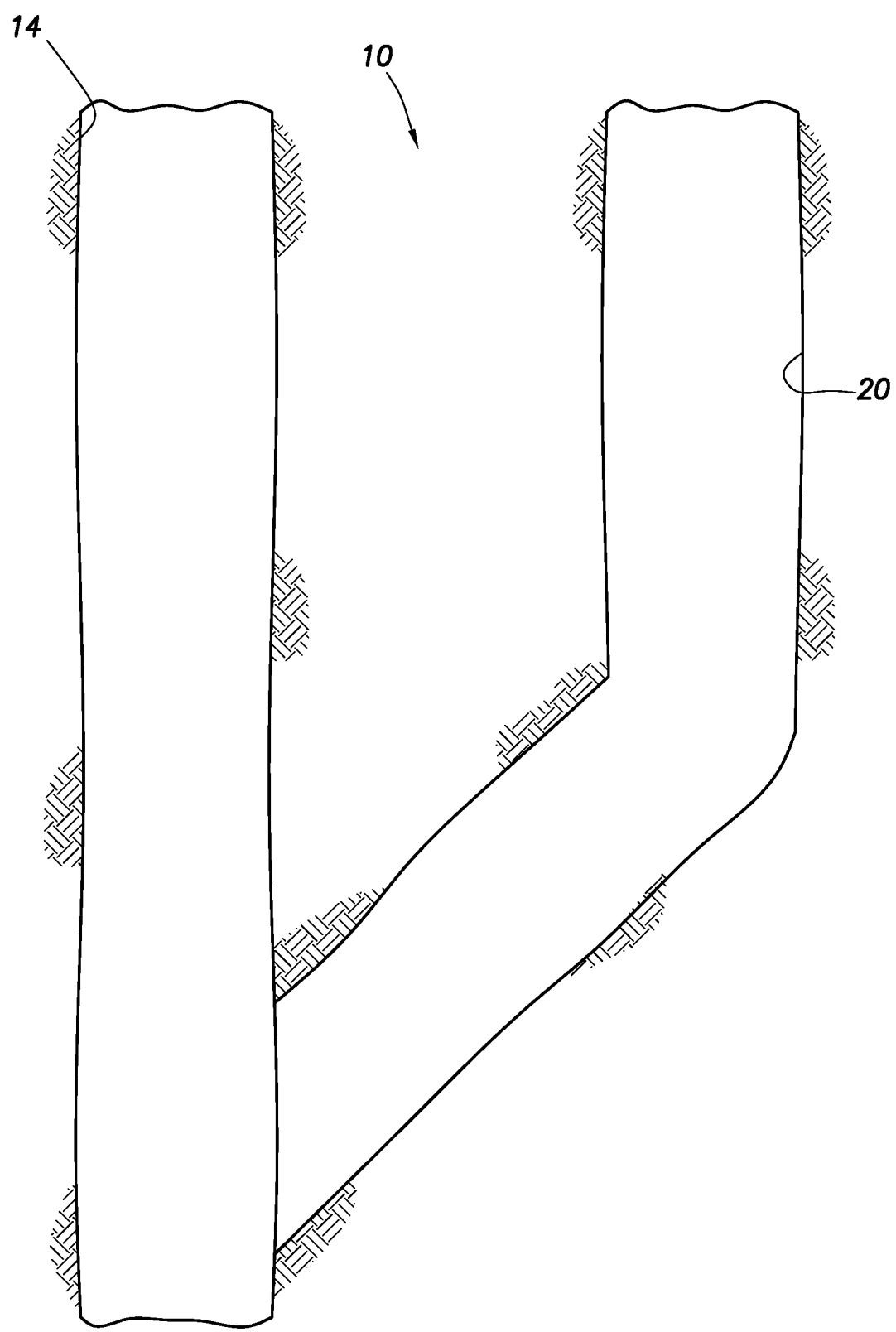
FIG. 4 is a representative cross-sectional view of the system and method, wherein fluid communication is established between the relief and target wellbores.

Referring additionally now to FIG. 4, the well system 10 is representatively illustrated after direct fluid communication has been established between the target and relief wellbores 14, 20. Physical access between the target and relief wellbores 14, 20 is also provided in the example depicted in FIG. 4, although direct physical access is not necessary in keeping with the scope of this disclosure.

In this example, the relief wellbore 20 is drilled toward the target wellbore 14, until the relief wellbore intersects the target wellbore, for example, using directional drilling techniques. However, in other examples other techniques (such as, lateral wellbore drilling, short radius jet drilling, explosives as described in International application no. PCT/US14/38520 filed 17 May 2014, etc.) may be used to establish fluid communication with the target wellbore 14. Thus, the scope of this disclosure is not limited to any particular technique for establishing fluid communication between the target and relief wellbores 14, 20.

Fluid communication may be established with the target wellbore 14 above, below or at the location of the influx 12 (not shown in FIG. 4, see FIGS. 1-3). Because the principles described above provide for determining the location of the influx 12, a decision as to where to establish fluid communication with the target wellbore 14 can be made with increased confidence.

It may now be fully appreciated that the above disclosure provides significant advancements to the art of ranging from a relief wellbore to a target wellbore. In examples described above, measurements of microseismic events 18 in the relief wellbore 20 can be used to determine the location of the influx 12 into the target wellbore 14.

A method is provided to the art by the above disclosure. In one example, the method can comprise: measuring microseismic activity in a relief wellbore 20, thereby detecting at least one microseismic event 18 in an earth formation 16 penetrated by the relief wellbore 20; and determining a location of an influx 12 into a target wellbore 14, based on the microseismic event detecting.

The microseismic event 18 can be produced in response to the influx 12 into the target wellbore 14.

The measuring step may be performed with at least one microseismic sensor 28 positioned in the relief wellbore 20. The microseismic sensor 28 can comprise a geophone.

The measuring step may include detecting optical scattering in an optical waveguide 30 positioned in the relief wellbore 20. The optical waveguide 30 may be positioned in a drill string 24.

The method can also include establishing fluid communication between the relief and target wellbores 20, 14 after the determining step.

The location of the influx 12 may be at an open hole portion of the target wellbore 14.

A microseismic ranging system 22 for use with a subterranean well is also provided to the art by the above disclosure. In one example, the system 22 can include at least one microseismic sensor 28 in a relief wellbore 20 that penetrates an earth formation 16. The microseismic sensor 28 detects a microseismic event 18 in the formation 16. The microseismic event 18 is caused by an influx 12 into a target wellbore 14.

The microseismic sensor 28 can comprise a geophone and/or an optical waveguide 30. The system 22 can include an optical interrogator 32 that measures scattering in the optical waveguide 30.

Also described above is a method that can include measuring optical scattering in an optical waveguide 30 positioned in a relief wellbore 20, thereby detecting at least one microseismic event 18 in an earth formation 16 penetrated by the relief wellbore 20; and determining a location of an influx 12 into a target wellbore 14, based on the microseismic event detecting.

The microseismic event 18 may be caused by a change in stress distribution in the formation 16, and/or by a change in reservoir volume in the formation 16.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method, comprising:
    measuring microseismic activity in a relief wellbore that is being drilled to intersect an existing target wellbore, thereby detecting a microseismic event in an earth formation that is produced in response to an influx into the target wellbore; and
    determining a location of the influx into the target wellbore, based on the detected microseismic event.

2. The method of claim 1, wherein the measuring is performed with at least one microseismic sensor positioned in the relief wellbore.

3. The method of claim 2, wherein the microseismic sensor comprises a geophone.

4. The method of claim 1, wherein the measuring comprises detecting optical scattering in an optical waveguide positioned in the relief wellbore.

5. The method of claim 4, wherein the optical waveguide is positioned in a drill string.

6. The method of claim 1, further comprising establishing fluid communication between the relief and target wellbores after the determining.

7. The method of claim 1, wherein the location of the influx is at an open hole portion of the target wellbore.

8. A microseismic ranging system for use with a subterranean well, comprising:
    at least one microseismic sensor in a relief wellbore that is being drilled to intersect an existing target wellbore, wherein the microseismic sensor detects a microseismic event in the formation, the microseismic event being caused by an influx into the target wellbore.

9. The system of claim 8, wherein the microseismic sensor comprises a geophone.

10. The system of claim 9, wherein the microseismic sensor comprises an optical waveguide.

11. The system of claim 10, further comprising an optical interrogator that measures scattering in the optical waveguide.

12. The system of claim 8, wherein the influx is at an open hole portion of the target wellbore.

13. The system of claim 8, wherein the optical waveguide is positioned in a drill string.

14. A method, comprising:
    measuring optical scattering in an optical waveguide positioned in a relief wellbore that is being drilled to intersect an existing target wellbore, thereby detecting a microseismic event in an earth formation that is produced in response to an influx into the target wellbore; and determining a location of the influx into the target wellbore, based on the detected microseismic event.

15. The method of claim 14, wherein the microseismic event is caused by a change in stress distribution in the formation.

16. The method of claim 14, wherein the microseismic event is caused by a change in reservoir volume in the formation.

17. The method of claim 14, further comprising establishing fluid communication between the relief and target wellbores after the determining.

18. The method of claim 14, wherein the location of the influx is at an open hole portion of the target wellbore.

* * * * *